July 6, 1937.  O. N. MELTON  2,086,087
CRIME DETECTION APPARATUS
Filed June 30, 1936  2 Sheets-Sheet 2
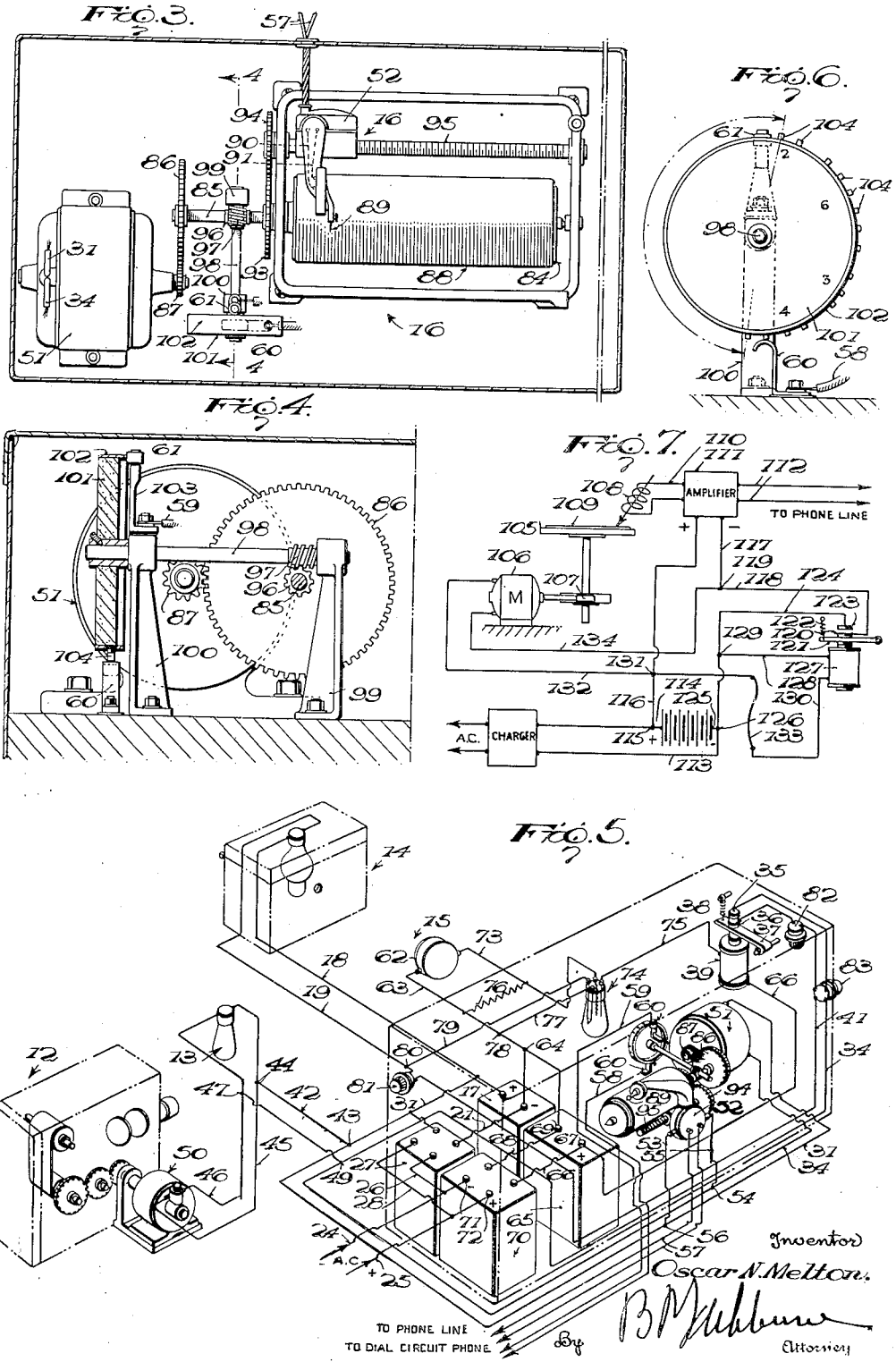

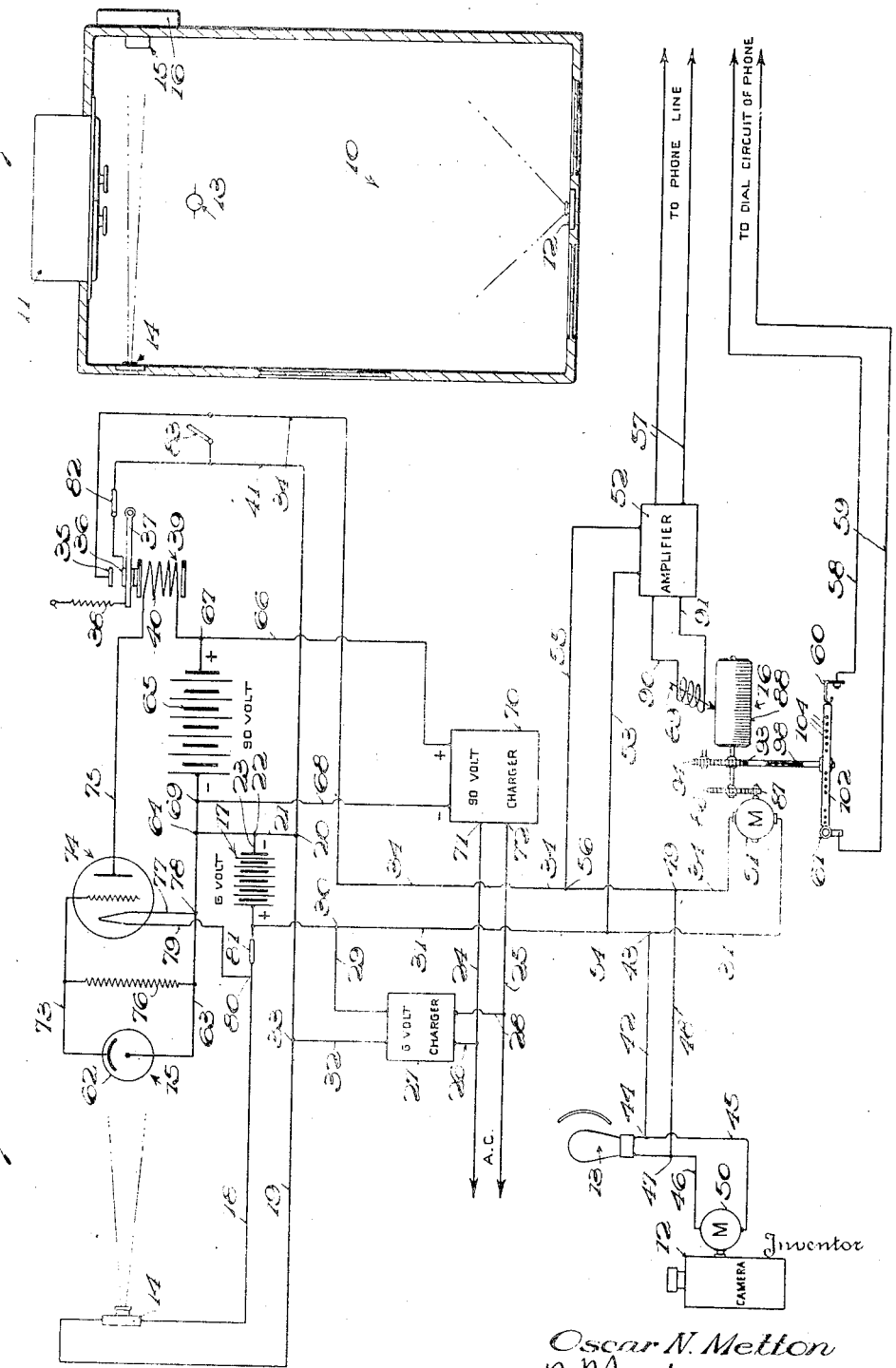

Patented July 6, 1937

2,086,087

UNITED STATES PATENT OFFICE 2,086,087

CRIME DETECTION APPARATUS

Oscar N. Melton, Gaffney, S. C., assignor of one-half to Charles M. Smith, Gaffney, S. C.

Application June 30, 1936, Serial No. 88,257

3 Claims. (Cl. 88—16)

My invention relates to crime detection apparatus.

An important object of the invention is to provide apparatus of the above mentioned character which will take a moving picture of an unauthorized person, such as a burglar, without such person being aware of the fact that the picture is being taken.

A further object of the invention is to provide a light sensitive means for throwing the apparatus into operation when the unauthorized person passes through the projected light, in approaching a safe or the like.

A further object of the invention is to provide apparatus of the above mentioned character which will produce an inaudible signal and transmit the same to a remote point, such as a police station or the like, thus advising such station that a robbery or other crime is being committed.

A further object of the invention is to provide apparatus of the above mentioned character which is relatively simple in construction and reliable in operation.

Other objects and advantages of the invention will be apparent during the course of the following description.

In the accompanying drawings forming a part of this application and in which like numerals are employed to designate like parts through the same, Figure 1 is a plan view of a room of a bank vault, with my protecting apparatus applied thereto, Figure 2 is a diagrammatic view of the apparatus and circuits included therein, Figure 3 is a plan view of the phonograph unit, Figure 4 is a transverse section taken on line 4—4 of Figure 3, Figure 5 is an exploded perspective view of the units of the apparatus, Figure 6 is a side elevation of the circuit closing impulse producing device, and, Figure 7 is a diagrammatic view of a modified form of apparatus used as a fire alarm or reporter.

As shown in Figure 1, the numeral 10 designates a room, which may be the room in a bank, having a vault 11 at one end of the same. This room and vault is used for the purpose of illustrating the invention, while the apparatus embodying the invention may be used in various other locations, as may be advantageous. In the present illustration, the numeral 12 designates a moving picture camera, which is preferably arranged opposite and in front of the vault 11. This camera may be properly disguised or concealed so that it would not be observed by the burglar. This motion picture camera will operate with a film which is sensitive to light which is invisible to the human eye. Such films are made by the Eastman Kodak Company. The Eastman Kodak Company makes such a film known as the "Pan K" film, which has its maximum infra red sensitivity in approximately 7400 Au, with a sensitivity range of from 7000 Au to 8000 Au. I prefer to photograph with the film with an infra red light at approximately 7400 Au, as an infra red light 7000 Au is invisible to the human eye or substantially so. The numeral 13 designates an infra red light or bulb arranged near the vault 11, to illuminate the same for the purpose of enabling the motion picture camera 12 to take the pictures, with its special film, although the light from the bulb is invisible to the human eye, or substantially so. The bulb 13 may be suitably disguised or concealed so that it will not be readily observed by the burglar. This bulb remains inactive until the apparatus is set into action by the burglar. The numeral 14 designates a separate infra red light or bulb, arranged upon one side of the room, suitably near the vault, and this bulb is suitably disguised or concealed, so that it will not readily be observed by the burglar. Upon the opposite side wall of the room is arranged a light sensitive circuit closing and opening device 15, controlled in action by the rays of light from the infra red light or bulb 14. The rays of light from the bulb 14 are invisible to the human eye or substantially so. The bulb 13 is not arranged in alignment with the bulb 14 but is preferably above the same. It might be stated at this point that when an unauthorized person, such as a burglar, approaches the vault 11, he will move into the path of travel of the rays of light from the infra red bulb 14, thereby intercepting such rays, with the result that the light sensitive device 15 will throw the apparatus into operation. A phonograph 16 is also used, to transmit a signal to a remote point, that the crime is being committed, and this phonograph is thrown into action at the same time that the motion picture camera is started. The phonograph is preferably arranged outside of the room 10, although it may be arranged at any suitable location.

In Figure 2, I have shown diagrammatically, the apparatus and the several circuits, which will now be described. The numeral 17 designates a source of direct current, which is preferably a six volt battery. Connected with the positive pole of the battery 17 is a wire 18, which is connected with one terminal of the bulb 14, the opposite terminal of this bulb being connected with a wire 19, connected at 20 with a wire 21. Wire 21 is connected at 22 with a wire 23, in turn connected with the negative pole of the battery 17. The numerals 24 and 25 designate wires included in an alternating current circuit and connected with opposite poles of the source of alternating current. A wire 26 connects wire 24 with one terminal of a charger 27, while a wire 28 connects the wire 25 with the companion terminal of this charger. The positive terminal of this charger 27 is connected with a wire 29, connected at 30 with a wire 31, and this wire 31 is connected with the wire 18 and with the positive pole of the six volt battery 17. The negative terminal of the charger 27 is connected with a wire 32, connected with the wire 19 at 33, and the wire 32 is hence connected with the negative pole of the battery. It is thus seen that the charger 27 is properly connected with the opposite poles of the six volt battery 17 to charge the same.

The wire 31 is connected with the positive pole of the battery 17, and a wire 34 is adapted to be connected with the negative pole of the battery 17. The wire 34 is connected with a stationary contact 35, arranged to be engaged by a movable contact 36, rigidly secured to and insulated from a vertically movable armature 37, moved upwardly by a retractile coil spring 38. The spring 38 causes the movable contact 36 to engage the contact 35, while the armature is moved downwardly to break this engagement by an electromagnet 39, having a winding 40. The contact 36 is electrically connected with a wire 41, and this wire is connected at 20, with the wire 21 and hence with the negative pole of the six volt battery 17.

Connected with the wire 31 is a wire 42, as shown at 43, and the wire 42 is connected at 44 with a wire 45. Wire 45 is connected with one terminal of the bulb 13, the opposite terminal of which is connected with a wire 46. Wire 46 is connected at 47 with a wire 48, which is connected with the wire 34 at 49. The wire 46 is also connected with one terminal of a motor 50, which drives the motion picture camera 12, and the opposite terminal of this motor is connected with the wire 45.

The wire 31 is connected with one terminal of a motor 51, which drives the phonograph, and the opposite terminal of this motor is connected with the wire 34.

The numeral 52 designates an amplifier having a wire 53 connected with its positive terminal, and this wire 53 is connected with the wire 31 at 54. A wire 55 is connected with the negative terminal of the amplifier 52 and is connected with the wire 34 at 56. Wires 57 are connected with the amplifier 52 and lead to the telephone line.

Wires 58 and 59 lead to the dial circuit of the telephone and the power for this circuit is furnished by the telephone company. Wire 58 is connected with a contact 60, and wire 59 is connected with a roller 61, to be more fully described.

Light sensitive means is provided for controlling the circuit, to be described, which energizes the electro-magnet 39. This light sensitive means comprises a photo-electric cell 62, one element of which is connected with a wire 63. The wire 63 is connected with the wire 21 at 64 and is also connected with the negative pole of a source of direct current, such as a ninety volt battery 65. The positive pole of the battery 65 is connected with a wire 66 at 67. A wire 68 is connected with the wire 63 at 69 and hence with the negative pole of the ninety volt battery 65. A ninety volt charger 70 has its positive terminal connected with the wire 66 and its negative terminal with the wire 68, while this charger is connected with the wires 24 and 25, at 71 and 72, respectively. It is thus seen that a circuit is provided for charging the ninety volt battery. The wire 66 is connected with one end of the winding 40 of the electro-magnet. The coacting element of the photo-electric cell 62 is connected with a wire 73. The numeral 74 designates a direct current resistance amplifying tube, the grid of which is connected with the wire 73, with the coacting plate connected with a wire 75, which is connected with the opposite end of the electro-magnet winding 40. A resistance 76 is also connected across wires 63 and 73. The tube 74 has one terminal of its filament connected with a wire 77, which is connected with the wire 63, at 78, the opposite terminal of the filament being connected with a wire 79, connected with the wire 18, at 80. The filament therefore has its terminals connected with the opposite poles of the six volt battery 17.

A switch 81 is connected in the wire 18, and a switch 82 is connected in the wire 41, and these switches are opened when the system is to be rendered inactive, such as during the day. A switch 83 is connected across wires 34 and 41, and this switch is opened when the system is rendered active, but may be closed during the day to give a daytime alarm.

It might be stated at this point that when the source of light 14 projects the infra red light upon the photo-electric cell 62, with switches 81 and 82 closed and switch 83 open, current will pass from the positive pole of the ninety volt battery 65 through a portion of wire 66, winding 40, wire 75, amplifying tube 74, wire 77, and wire 63 back to the negative pole of the battery 65. Current is also being supplied to the filament of the tube 74 from the six volt battery, such current passing from the positive side of the battery through a portion of wire 18, wire 79, filament, wire 77, wire 63 to point 64 and wire 21 to the negative pole of the battery 17. The potential of the grid in the amplifying tube is controlled by the resistance of the input circuit including the cell 62. When the light fails to shine upon the cell the resistance of the input circuit is increased and the potential of the grid altered so that it blocks the passage of current in the electro-magnetic circuit and the electro-magnet becomes deenergized. It is thus seen that an electro-magnet circuit is closed to energize the electro-magnet, when infra red rays are projected upon the photo-electric cell 62 from the source of light 14, but when these rays are intercepted the potential of the grid is changed so that the grid blocks the flow of current in the electro-magnet circuit.

Referring now in particular to Figures 3, 4 and 5, it will be seen that the phonograph comprises a cylindrical platen 84, which is driven by a horizontal shaft 85, supported in suitable bearings, and rotated by a pinion 86. This pinion is driven by a smaller pinion 87, in turn driven by the motor 51. The cylindrical platen receives thereon a tubular record 88. The phonograph is preferably of the electro-magnetic type and embodies a needle 89 for coaction with the record and this needle may operate a magnetic element to induce a weak pulsating current in a circuit including wires 90 and 91, which are connected with the amplifier 52. This weak pulsating current is amplified by the amplifier and transmitted to wires 57. While it is preferred to employ a phonograph of the electro-magnetic type, yet the invention is not necessarily restricted to the same, as the mechanical type of phonograph may be used. Since electro-magnet pick-ups for phonographs are well known, it is thought to be unnecessary to further describe the same. Where a direct talking circuit is provided between the building or point being protected and the outlying point, the record 88 would be inscribed to reproduce a statement concerning the particular crime or incident, such as "Bank being robbed at 15th and Meeting Streets". If this message is to be sent to a telephone exchange so that the connection is to be made with a remote point, such as a police station, the record would be inscribed so that the message would be "Calling police station, National 3000", and might be repeated any number of times and followed by the statement as to the robbery. It is obvious that the invention is not restricted to any particular message inscribed upon the record, nor is the invention restricted to a tubular type of record as a disk record phonograph may be used.

The shaft 85 is provided with a pinion 93, driving a pinion 94, in turn rotating a feed screw 95, which serves to properly advance the element of the phonograph including the needle 89.

The shaft 85 is further provided with a worm wheel 96, Figure 4, engaging a worm 97, formed upon a transverse shaft 98, journalled in stationary bearings 99 and 100. The shaft 98 carries an insulating wheel 101, rotatable therewith and formed of bakelite or the like. This insulating wheel is provided at its periphery with a metal contact ring 102, preferably formed of copper. The contact roller 61 is rotatably mounted upon a stationary arm 103, in turn mounted upon the bearing 100 and insulated therefrom. Contact arm 103 is connected with the wire 59. The contact ring 102 is provided throughout its periphery with equi-distantly spaced screw-threaded openings within which pins 104 are inserted and screwed. These pins are arranged in groups, with a selected number of pins in each group, and the pins are adapted to engage the contact 60. It is thus seen that as the wheel 101 is turned and the groups of pins move into contact with and across the contact 60, a succession of impulses is produced for each group, depending upon the number of pins therein. These impulses will be transmitted through wires 58 and 59 to the dial circuit of the phone. The groups of pins 104 extend throughout about one-half of the periphery of the contact ring, and since both the phonograph and the wheel 101 are driven in unison, the phonograph may be so timed in operation that it will produce the sound before the contact 60 engages the sets of pins. The impulses and the message may therefore be intermittently given. The means including the wheel 101 and pins 104 are used only where the system is connected to dial phone system. When the phone system is not of the dial type, then I use the record call arrangement as described.

The operation of the apparatus is as follows:
When the apparatus is used at night to protect a bank vault, switches 81 and 82 are closed, while switch 83 is opened. The light from the infra red bulb 14 is now projected upon the photo-electric cell 62, and the circuit is closed by the amplifying tube 74 to retain the electro-magnet 39 energized, whereby the armature 37 is drawn downwardly and contact 36 disengages contact 35. The infra red bulb 13, which furnishes light for taking the pictures is now inactive, and all units of the apparatus are at rest. When the burglar or unauthorized person approaches the vault 11 and intercepts the infra red rays from the bulb 14, such rays do not strike the photo-electric cell 62, and current will not flow in the circuit to energize the electro-magnet 39, and this electro-magnet becomes deenergized, with contact 36 engaging contact 35. Armature 37 is raised by the spring 38 and will remain in this raised position until manually reset. As soon as this occurs, a circuit is closed to render the infra red bulb 13 active. In this closed circuit, current will flow from the positive side of the six volt battery 17 through wire 31, wire 42, a portion of wire 45, bulb 13, a portion of wire 46, wire 48 to point 49, wire 34, contact 35, contact 36, wire 41, and through wire 21 to the negative pole of the battery 17. When this occurs, a circuit is also closed to drive the motion picture camera motor 50, and in this closed circuit current flows from the positive side of the battery 17, through wire 42, a portion of wire 45, motor 50, a portion of wire 46, wire 48, to wire 34, and back to the negative pole of the battery 17. A circuit is also closed at the same time to drive the phonograph motor 51, and in this closed circuit current flows from the positive side of the battery 17 through wire 31, motor 51, and through wire 34 back to the negative pole of the battery 17. It is thus seen that the bulb 13, motion picture camera, and phonograph are thus simultaneously thrown into action. At the same time, a circuit is closed to supply current to the amplifier 52, and in this closed circuit current flows from the positive pole of the battery 17 through wire 31 to point 54, through wire 53, to the positive terminal of the amplifier to the negative terminal of the amplifier, through wire 55, and to wire 34, and hence to the negative pole of the battery 17. The closing of the amplifier circuit by the contact 36 engaging contact 35, corresponds to the closing of the telephone circuit by lifting the receiver from the usual telephone apparatus. As before stated, the light from the infra red bulb 14 is invisible to the human eye or substantially so, and the same is true of the light from the infra red bulb 13. The burglar thus automatically sets the apparatus into action and a motion picture film is made of the burglar during his very act of robbery, and may be accomplished without his knowledge of the same. It is of course desirous that the robbery should be known to the police or other authorities, and this is effected by setting into action the phonograph which is done at the same time that the motion picture camera is started. The phonograph reproduces the sound impulses which are amplified and transmitted to the telephone line, to the outlying point. When the phonograph is set into action, the wheel 101 is rotated to produce the impulses for the reasons explained.

In Figure 7, I have shown a fire alarm system, which constitutes a modified form of my invention. This system comprises a phonograph, including a rotatable platen 105, which is driven by a motor 106, through the medium of speed reducing gearing 107. An electro-magnetic pick-up device 108 includes a needle for coaction with a record 109, and this needle induces weak pulsating currents in a circuit 110, which leads to an amplifier 111, connected with wires 112, extending to the telephone line. The numeral 113 designates a source of direct current, such as a battery, having a wire 114 connected with its positive side, which is connected at 115 with a wire 116, and the wire 116 is connected with the positive terminal of the amplifier. The negative terminal of the amplifier is connected with a wire 118, at 119. Wire 118 is connected with a movable contact 120, rigidly mounted upon the armature 121 and insulated therefrom. The armature is moved upwardly by a retractile coil spring 122, so that contact 120 may engage a stationary contact 123. Stationary contact 123 is connected with a wire 124, which is connected with a wire 125, at 126, and wire 125 is connected with the negative pole of the battery. An electro-magnet 127 is arranged near and beneath the armature 121, to draw the same downwardly when energized. This electro-magnet has one end of its winding connected with a wire 128, connected with the wire 124 at 129. The opposite end of the winding of the electro-magnet 127 is connected with a wire 130, which is connected with wire 118 at 131 and also with a wire 132, connected with one pole of the motor 106. The wire 130 has a fusible portion 133, or a fusible element connected therein. The opposite pole of the motor 106 is connected with a wire 134, which is connected with the wire 118 at 119.

The operation of this apparatus is as follows:
Before the fusible portion or element 133 melts, a circuit is retained closed whereby electro-magnet 127 is energized and contact 120 retained out of engagement with contact 123. In this closed circuit current flows from the positive side of the source of current 113, through a portion of wire 114, wire 116, to point 131, wire 130 to one end of the winding of the electro-magnet 127, through the electro-magnet, through wire 128 to point 129, through a portion of wire 124, and through wire 125 back to the negative pole of the battery. When the element 133 melts or fuses, due to the action of heat, when a fire occurs, the electro-magnet circuit is opened and spring 122 will bring contact 120 into engagement with contact 123, to close the motor circuit. In this closed circuit, current flows from the positive side of the battery 113, through a portion of wire 116, through wire 132, through the motor 106, wire 134, contact 123, wire 124, and wire 125, back to the negative side of the battery 113. A circuit is also closed to supply current to the amplifier 111, and in this circuit current passes from the positive side of the battery 113, through a portion of wire 114, wire 116 to the positive terminal of the amplifier through the amplifier, through wire 117 to point 119 and through wire 118 back to the negative side of the battery. When this occurs, the phonograph will reproduce the desired message, which is amplified and transmitted through wire 112 to the telephone line.

It is to be understood that the forms of my invention herewith shown and described are to be taken as preferred examples of the same and that various changes in the shape, size and arrangement of parts may be resorted to without departing from the spirit of my invention or the scope of the subjoined claims.

Having thus described my invention, I claim:

1. A crime detection apparatus, comprising a normally inactive motion picture camera for taking pictures with infra red light which is substantially invisible to the eye, a normally inactive source of infra red light for the camera, a normally open circuit connected with the camera and source of infra red light and rendering the same active when such circuit is closed, and means to control the operation of said circuit, said means including a normally active source of infra red light and a photo electric cell having the rays of light from the normally active source of infra red light projected thereon, the arrangement being such that when the rays of light from the normally active source of light are intercepted that said circuit is closed and the camera and first named source of infra red light rendered active.

2. A crime detection apparatus, comprising a normally inactive motion picture camera for taking pictures with infra red light which is substantially invisible to the eye, a normally inactive source of infra red light for the camera, a normally open circuit connected with the camera and source of infra red light and rendering the same active when such circuit is closed, a self closing relay connected in the circuit to close it when the relay closes, an electro-magnet adapted when energized to open the relay, a circuit connected with the electro-magnet and including a photo electric cell, and a normally active source of infra red light arranged to project such light upon the photo electric cell, the arrangement being such that the electro-magnet is de-energized when the last named rays are intercepted and prevented from projecting upon the photo electric cell.

3. A crime detection apparatus, comprising a normally inactive motion picture camera for taking pictures with infra red light which is substantially invisible to the eye, a normally inactive source of infra red light for the camera, a normally open circuit connected with the camera and source of infra red light and rendering the same active when such circuit is closed, a self closing relay connected in the circuit to close it when the relay closes, an electro-magnet adapted when energized to open the relay, a circuit connected with the electro-magnet and including a photo electric cell and a normally active source of infra red light arranged to project such light upon the photo electric cell, the arrangement being such that the electro-magnet is de-energized when the last named rays are intercepted and prevented from projecting upon the photo electric cell, and signal means automatically set into action when the motion picture camera is rendered active.

OSCAR N. MELTON.